United States Patent [19]
Disch et al.

[11] Patent Number: 5,907,029
[45] Date of Patent: May 25, 1999

[54] SOLUBLE POLYARYLENE SULFOXIDES, A PROCESS FOR THEIR PREPARATION AND THEIR USE

[75] Inventors: Stefan Disch, Frankfurt; Michael Haubs, Bad Kreuznach; Axel Schönfeld, Wiesbaden; Helmut Scheckenbach, Langen, all of Germany

[73] Assignee: Hoechst Aktiengesellschaft, Germany

[21] Appl. No.: 08/931,554

[22] Filed: Sep. 16, 1997

[30] Foreign Application Priority Data

Sep. 17, 1996 [DE] Germany ............................ 196 37 845
Apr. 17, 1997 [DE] Germany ............................ 197 16 016

[51] Int. Cl.$^6$ .................................................. C08G 75/04
[52] U.S. Cl. ............................ 528/373; 528/382; 528/388
[58] Field of Search .................................... 528/373, 382, 528/388

[56] References Cited

FOREIGN PATENT DOCUMENTS 738 760   4/1996   European Pat. Off. .
96/15178  5/1996   WIPO .

*Primary Examiner*—Terressa Mosley
*Attorney, Agent, or Firm*—Connolly & Hutz

[57] ABSTRACT

The invention relates to polyarylene sulfoxides which are soluble in polar organic solvents, a process for their preparation and their use. Soluble polyarylene sulfoxides can be prepared by homogeneous partial oxidation of polyarylene sulfides. The homogeneous partial oxidation is achieved by dispersing the polyarylene sulfide in finely divided form in a solvent stable to oxidation, slowly adding a mild oxidizing agent and terminating the oxidation as soon as the polymer chains have reached a uniform degree of oxidation. The partially oxidized polyarylene sulfoxides are suitable for the production of coatings and shaped articles, such as fibers, membranes, films and nonwovens.

19 Claims, No Drawings

SOLUBLE POLYARYLENE SULFOXIDES, A PROCESS FOR THEIR PREPARATION AND THEIR USE

The invention relates to polyarylene sulfoxides which are soluble in polar organic solvents and a process for their preparation. The invention also relates to the use of soluble polyarylene sulfoxides for the production of shaped articles.

Polyarylene sulfoxide can be obtained by polymer-analogous oxidation of polyarylene sulfides. Polymer-analogous is understood as meaning the chemical transformation of one polymer into another polymer with retention of the chain length. However, the polyarylene sulfoxides known to date dissolve only in strong mineral acids, such as concentrated nitric acid, or strong organic acids, e.g. dichloroacetic acid or trifluoroacetic acid. For many technical applications which require polymer solutions, these solvents are not suitable. An example is the coating of shaped articles from solution. Since strong acids have a corrosive effect on many shaped metal articles and can lead to degradation of the polymer chains, they are unsuitable as solvents for coating systems.

The oxidation of polyphenylene sulfide to polyphenylene sulfoxide with nitric acid is known (U.S. Pat. No. 3,303,087). The polyarylene sulfoxides obtained are soluble in strong acids but not in polar organic solvents.

Polyarylene sulfoxides and their preparation by the oxidation of polyarylene thioethers with ozone in a liquid suspension medium are likewise known (DE-4314735 A1 and DE 4314736 A1). By varying the amount of ozone, the duration of the reaction and the suspension medium, it is possible to adjust the degree of oxidation. However, these polyarylene sulfoxides too are insoluble in organic solvents.

Finally, the oxidation of polyarylene sulfides with $N_2O_4$ is described (WO 96/15178). The reaction can be carried out as a direct gas-solid reaction, but it is also possible to work in an inert suspension medium. Moreover, the reaction can be carried out in a liquid in which the reaction product dissolves, for example dichloroacetic acid or trifluoroacetic acid. This publication also discloses partly oxidized polyarylene sulfides, but the partially oxidized polyarylene sulfoxides too—like the abovementioned reaction products—are insoluble in organic solvents.

It was the object of the invention to avoid the known disadvantages of the prior art.

The invention relates to a soluble, linear or branched polyarylene sulfoxide which contains arylene sulfoxide units (Ar—SO, Ar=arylene) and has a degree of oxidation from 20 to 80%. It is soluble in polar organic solvents at temperatures of from −20° C. to 100° C., preferably from 0° C. to 70° C., in particular from 10° C. to 55° C., the solubility being at least 1% by weight, preferably at least 10% by weight. The soluble polyarylene sulfoxides have a degree of oxidation of from 20% to 80%, preferably from 50% to 70%.

The invention furthermore relates to a modified process for the preparation of polyarylene sulfoxides by oxidation of polyarylene sulfide with $N_2O_4$, the polyarylene sulfoxides undergoing homogenous partial oxidation.

Finally, the invention relates to the use of the soluble polyarylene sulfoxides.

The invention has made it possible to prepare polyarylene sulfoxides which are soluble in organic solvents and have a sufficiently high molecular weight. The polyarylene sulfides used as starting material undergo homogeneous partial oxidation. According to the definition, all partially oxidized polymer molecules have the same degree of oxidation in a homogeneous partial oxidation.

Homogeneous partial oxidation is in general difficult to achieve in the case of polyarylene sulfides since the polyarylene sulfides used as starting material are insoluble under the reaction conditions. This leads to the polyarylene sulfides insoluble in the reaction medium being more strongly oxidized at the phase boundary and highly oxidized in addition to slightly oxidized polyarylene sulfoxide chains being obtained in a partial oxidation. However, homogeneous partial oxidation can be achieved by first dispersing the finely distributed polyarylene sulfide in a solvent and then slowly adding a mild oxidizing agent with vigorous stirring. The reaction mixture is further stirred without further additional oxidizing agent, the total polyarylene sulfide going into solution with formation of polyarylene sulfoxide. To isolate the polyarylene sulfoxide, the reaction solution is generally added to 10 times the amount of water with stirring, the polymer being precipitated. It is filtered off, washed with water and dried at 50° C. under reduced pressure. Polyarylene sulfoxides which are soluble in polar organic solvents are obtained in this manner. The degree of oxidation, i.e. the amount of sulfur atoms which were oxidized to sulfoxide groups, is from 20% to 80%, preferably from 50% to 70%.

Polyarylene sulfides, in particular polyphenylene sulfide, can be prepared on the basis of the reaction of dihalogenated aromatic compounds of sodium sulfide according to EDMONDS and HILL (U.S. Pat. No. 3,354,129). Polyphenylene sulfide and its preparation are furthermore described in "Ullmann's Encyclopedia of Industrial Chemistry", Volume A21, pages 463–472, Verlag Chemie, Weinheim-New York 1992, which is hereby incorporated by reference. In principle, all linear and branched polyarylene sulfides may be used as a starting material for the preparation of the polyarylene sulfoxides according to the invention. However, polyarylene sulfides which contain unsubstituted arylene units are in particular polyphenylene sulfide, or arylene units which are substituted by nonionic groups, for example carboxylic acid derivatives, sulfonic acid derivatives or alkyl, allyl, aryl, halogen, amino, nitro, cyano or hydroxyl groups, are preferred.

In general, polyarylene sulfides which have an average molar mass Mn, determined by gel permeation chromatography, of from 4000 to $4 \cdot 10^5$ g/mol, preferably from $1 \cdot 10^4$ to $3 \cdot 10^5$ g/mol and in particular from $2.5 \cdot 10^4$ to $2 \cdot 10^5$ g/mol, are suitable for the preparation of the polyarylene sulfoxides according to the invention.

The polyarylene sulfides are usually used as finely divided powders, and the particle size should be in general from 0.1 $\mu$m to 1 mm, preferably from 1 $\mu$m to 500 $\mu$m, in particular from 1 $\mu$m to 300 $\mu$m. Powders having larger particle dimensions may also be used. It is preferable to use porous powders with internal surface areas from 0.1 $m^2/g$ to 500 $m^2/g$, preferably from 1 $m^2/g$ to 50 $m^2/g$, which can be prepared, for example, by reprecipitation.

The reaction medium in the homogeneous partial oxidation must be stable to oxidation; in addition, it must dissolve the partially oxidized polyarylene sulfide under the reaction conditions. Suitable reaction media are, for example, dichloroacetic acid, trichloroacetic acid or trifluoroacetic acid. The mild oxidizing agent used is $N_2O_4$. It is used in general in the form of a solution in an inert solvent or as 100% strength substance. The use of a 20% strength solution of $N_2O_4$ in dichloroacetic acid proves advantageous.

In general, the oxidizing agent is added over a period of from 2 minutes to 5 hours, preferably from 10 minutes to 60 minutes, it generally being used in substoichiometric amounts, i.e. from 0.5 to 1 mol of oxidizing agent per mol of the sulfur bound in the polymer. However, superstoichiometric amounts of oxidizing agent may also be used. In this case, the reaction must be terminated in good time so the degree of oxidation is not too high.

What is important for the subsequent solubility of the product in organic solvents is that the polyarylene sulfide is only partially oxidized. The oxidation reaction must be terminated when the polymer has reached the desired degree of oxidation after the end of the addition of the oxidizing agent and a subsequent stirring time, the reaction product dissolving completely in the reaction solvent. The required subsequent stirring time depends on the reaction temperature and on the added amount of oxidizing agent and is in general from 1 minute to 5 hours, preferably from 5 minutes to 30 minutes. The individual polymer molecules of the polyarylene sulfoxide then have approximately the same degree of oxidation stated in the claims, which corresponds to homogeneous partial oxidation. This chemical uniformity of the polymer molecules is a further important requirement for the solubility in organic solvents. As can be determined from the $^1$H-NMR spectroscopic analysis of the chain structure, the polymer molecules of the soluble polyarylene sulfoxides essentially comprise alternating units of sulfide and sulfoxide groups.

The preparation of the polyarylene sulfoxides can be carried out at temperatures of from −30° C. to 150° C., preferably from −20° C. to 50° C. and in particular from 0° C. to 30° C. The required reaction time depends on the temperature, the concentration of the oxidizing agent or the amount of oxidizing agent.

If poly-1,4-phenylene sulfide (PPS) is used as the starting material, the soluble compounds according to the invention are generally obtained when the reaction temperature during the preparation is from −20° C. to 40° C., preferably from 0° C. to 30° C. and there is a degree of oxidation of from 50% to 70%.

In the oxidation of the polyarylene sulfide to the polyarylene sulfoxide with $N_2O_4$, the $N_2O_4$ is reduced to $N_2O_3$. This $N_2O_3$ can be reoxidized to $N_2O_4$ by a subsequent oxidation, for example with oxygen, so that it is sufficient to use $N_2O_4$ in catalytic amounts.

After the end of the oxidation, the $N_2O_4$ can be expelled from the solution by an inert gas stream, condensed in a cooling apparatus and thus recovered. The reaction is preferably carried out at atmospheric pressure but may also be carried out under pressure with gaseous $N_2O_4$, it being possible for the gas atmosphere to contain oxygen for the regeneration of $N_2O_4$.

Polar organic solvents are dimethyl sulfoxide (DMSO), N-alkylated acidamides or N-alkylated cyclic lactams or mixtures thereof. The solubility in N-methyl-2-pyrrolidone (NMP), DMSO, dimethyl formamide and dimethyl acetamide is particularly good. In the case of NMP, the dissolution process may take place at as low as 20° C. and at atmospheric pressure.

The degree of oxidation of the polyarylene sulfoxides prepared according to the invention is determined by known methods using $^1$H-NMR spectroscopy in deuterated trifluoroacetic acid and Electron Spectroscopy for Chemical Analysis (ESCA). While the degree of oxidation in the sample is detected by means of $^1$H-NMR spectroscopy, the degree of oxidation at the surface is determined with the aid of ESCA. By means of $^1$H-NMR spectroscopy in deuterated trifluoroacetic acid, the structure of the polyarylene sulfides can be obtained by analysis of the intensity ratio of the resonant signals. In the case of the polyarylene sulfoxides according to the invention, it was found that they essentially composed of alternating units of sulfide and sulfoxide groups.

The polyarylene sulfoxides prepared according to the invention are suitable for industrial processing from solution in polar, organic solvents. They are particularly suitable for the production of shaped articles, such as films, membranes, nonwovens and fibers and for coating shaped articles. The soluble polyarylene sulfoxides or shaped articles obtained therefrom can, however, also be partially or completely converted into polyarylene sulfones with an oxidizing agent, for example with a solution of hydrogen peroxide in acetic acid. The polyarylene sulfone may also contain sulfide or sulfoxide groups, depending on the oxidation conditions.

Owing to the solubility of the polyarylene sulfoxides according to the invention in polar solvents, the coating of shaped articles, for example by means of dip or spray processes, is particularly simple. By the subsequent oxidation of the applied layer, it is possible to produce a shaped article having exceptional surface properties, such as heat resistance and resistance to chemicals.

EXAMPLES 1) 5.00 g of poly-1,4-phenylene sulfide (®Fortron 0214 B1, produced by Hoechst AG, Frankfurt, Germany) were suspended at 25° C. in 230 ml of dichloroacetic acid and oxidized by adding a total of 7 ml of a 20% solution of $N_2O_4$ in dichloroacetic acid. The addition was carried out by a procedure in which initially 2 ml and thereafter, at two minute intervals, 1 ml of $N_2O_4$ solution were added until a total amount of the $N_2O_4$ solution provided had been added. The reaction mixture was vigorously stirred during the addition. After the end of the addition of the oxidizing agent, stirring was carried out for a further 20 minutes at 25° C., the polymer dissolving completely. The deep green solution was then precipitated by slowly pouring into 4 l of iced water while stirring, the precipitate being finely distributed. The product was filtered off with suction and dried for 20 hours at 50° C. under reduced pressure. The poly-1,4-phenylene sulfoxide obtained was completely soluble in NMP at 25° C.

Yield: 5.1 g of poly-1,4-phenylene sulfoxide

Oxidation state of the sulfur according to ESCA: Sulfide 40%, sulfoxide 60%

$^1$H-NMR spectroscopic analysis using an MSL 360 from Bruker (Ettlingen, Germany) at 360 MHz in trifluoroacetic acid-d1: Degree of oxidation: 57%; Chain sequences: 15.7% of sulfoxide-sulfoxide units, 81.8% of sulfoxide-sulfide units, 2.5% of sulfide-sulfide units.

2) (Comparative example): 100 g of poly-1,4-phenylene sulfide (Fortron 0214 B1) were slowly added in portions, at 5° C., to 600 ml of 65% strength, aqueous nitric acid, stirring being carried out during the addition. After the addition, the mixture was slowly heated to 60° C. The suspension was kept at this temperature for 45 minutes. Thereafter, the reaction mixture was added to 2 l of water and the suspended particles were filtered off with suction. The product was washed neutral with water and dried at 80° C. under reduced pressure.

Yield: 114 g of poly-1,4-phenylene sulfoxide

Oxidation state of the sulfur according to ESCA: Sulfide 3%, sulfoxide 97%

At atmospheric pressure, the product was not soluble in NMP either at 25° C. or at the boiling point, but it was partially soluble in trifluoroacetic acid.

3) (Comparative example): 200 g of a poly-1,4-polyphenylene sulfide powder (Fortron 0214 B1) were suspended in a mixture of 850 ml of glacial acetic acid and 8.5 ml of sulfuric acid in a thermostattable bubble column (5 cm diameter, 120 cm length). At 25° C., the column was gassed through a glass frit with an ozone-containing airstream (flow rate 150 l/h) having an average concentration of 80 g of ozone per cubic meter of gas. After 80 minutes, the reaction was terminated after the absorption of 52 g of ozone. The polymer powder was filtered off, washed several times with water and dried at 50° C. under reduced pressure for 5 h. Oxidation state of the sulfur according to ESCA: Sulfide 45%, sulfoxide 55% The product was not soluble either in NMP or in trifluoroacetic acid.

4) (Comparative example): 3 g of a poly-1,4-phenylene sulfide powder (Fortron 0214 B1) in 5 ml of $N_2O_4$ were reacted at a temperature of 50° C. for 1 hour in a reaction vessel. After the reaction, the polymer powder was separated off from $N_2O_4$ and was dried. Tg: 240° C., Tm>370° C. (decomposition). The product was not soluble in NMP but was partially soluble in trifluoroacetic acid.

Oxidation state of the sulfur according to ESCA: Sulfide 2%, sulfoxide 98%.

5) (Comparative example): Example 1 was repeated, except that the reaction temperature and the temperature during the subsequent stirring process were each increased to 50° C.

The poly-1,4-phenylene sulfoxide obtained was not soluble in NMP either at 25° C. or at temperatures up to 100° C. at atmospheric pressure.

Yield: 4.8 g of poly-1,4-phenylene sulfoxide

Oxidation state of the sulfur according to ESCA: Sulfide 22%, sulfoxide 78%

6) (Production of a fiber): 1.5 g of the reaction product from Example 1 were dissolved in 8 g of NMP at 25° C. with stirring. A 20 cm long fiber was drawn from the solution by means of a glass rod. The freely suspended fiber was freed from solvent at 120° C. and 3 mbar. The thickness of the fiber after drying was 20 µm. The fiber was immersed, for 30 minutes at 65° C., in a solution of 20 ml of 50% strength hydrogen peroxide in 40 ml of acetic acid (100% strength) with the addition of 1 ml of concentrated $H_2SO_4$ and then dried at 150° C. and 3 mbar. Oxiation state of the sulfur in the fiber according to ESCA: sulfide 4%, sulfoxide 14%, sulfone 82%

DSC: Tg=350° C., Tm>550° C. (decomposition)

7) (Coating of a shaped article): A cylindrical shaped aluminum article having a length of 5 cm and a diameter of 1 cm was immersed in a solution of 5 g of the reaction product from Example 1 in 50 g of NMP. The shaped article was removed from the solution and dried at 120° C. and 3 mbar. In this process, the shaped article became coated with a polyphenylene sulfoxide layer of about 10 µm. The coated aluminum rod was immersed for 30 minutes at 65° C. in a solution of 20 ml of 50% strength hydrogen peroxide in 40 ml of acetic acid (100% strength) with the addition of 1 ml of concentrated $H_2SO_4$ and then dried at 150° C. and 3 mbar.

Oxidation state of the sulfur of the coating according to ESCA: Sulfide 4%, sulfoxide 28%, sulfone 68%.

We claim:

1. A soluble, linear or branched polyarylene sulfoxide comprising units of arylene (Ar), sulfide (S) and sulfoxide (SO), said arylene units being selectively substituted by a nonionic group and said arylene, sulfide and sulfoxide groups forming arylene sulfide (Ar—S) and arylene sulfoxide (Ar—SO) groups, and having a degree of oxidation of from 20 to 80% and a solubility in a polar organic solvent of at least 1% by weight.

2. The polyarylene sulfoxide as claimed in claim 1, wherein said degree of oxidation is from 50 to 70%.

3. A method of use of the polyarylene sulfoxide as claimed in claim 1 for the production of shaped articles and for the coating of shaped articles.

4. The polyarylene sulfoxide as claimed in claim 1, wherein said solubility is at least 10% by weight.

5. The polyarylene sulfoxide as claimed in claim 1, having a predetermined degree of oxidation and essentially containing alternating units of arylene sulfide and arylene sulfoxide groups.

6. The polyarylene sulfoxide as claimed in claim 1, wherein said nonionic group, is a carboxylic acid derivative, a sulfonic acid derivative or selected from the group of alkyl, allyl, aryl, halogen, amino, nitrol, cyano and hydroxyl groups.

7. The polyarylene sulfoxide as claimed in claim 1, wherein said arylene unit is phenylene.

8. A process for the preparation of a soluble, linear or branched polyarylene sulfoxide having arylene sulfoxide (Ar—SO, Ar=arylene) units comprising the step of subjecting a polyarylene sulfide in a reaction medium stable to oxidation to a homogeneous partial oxidation with an oxidizing agent to partially oxidize said polyarylene sulfide to obtain the polyarylene sulfoxide having a degree of oxidation of from 20 to 80%, said oxidizing agent being $N_2O_4$ and the reaction is terminated when the polymer has reached the desired degree of oxidation after the end of the addition of the oxidizing agent and a subsequent stirring and said polyarylene sulfoxide is soluble in a polar organic solvent.

9. The process as claimed in claim 8, wherein said oxidizing agent is dissolved in an inert solvent or is a 100% strength substance.

10. The process as claimed in claim 8, wherein said reaction medium is dichloroacetic acid, trichloroacetic acid or trifluoroacetic acid.

11. The process as claimed in claim 9, wherein said inert solvent is dichloroacetic acid and said oxidizing agent forms a 20% strength solution in said inert solvent.

12. The process as claimed in claim 8, comprising the steps of adding said polyarylene sulfide to said reaction medium to form a dispersion, adding said oxidizing agent to said dispersion with vigorous stirring to obtain a reaction mixture, subsequently stirring said reaction mixture, said polyarylene sulfide reacting with said oxidizing agent to form the soluble polyarylene sulfoxide, and isolating the polyarylene sulfoxide from said reaction mixture.

13. The process as claimed in claim 8, wherein said polyarylene sulfide is a finely divided powder having a particle size of from 0.1 µm to 1 mm, and an internal surface area of from 0.1 to 500 $m^2$/g.

14. The process as claimed in claim 8, wherein said polyarylene sulfide has an average molar mass $M_n$ of from 4000 to $4 \cdot 10^5$ g/mol determined by gel permeation chromatography.

15. The process as claimed in claim 12, wherein said oxidizing agent is added in a period of from 2 minutes to 5 hours, and said reaction mixture is subsequently stirred for a period of from 1 minute to 5 hours.

16. The process as claimed in claim 8, wherein said oxidation is carried out at from −30° C. to 150° C.

17. The process as claimed in claim 8, wherein said polyarylene sulfide is poly-1,4-phenylene sulfide, said oxidation is carried out at −20° C. to 40° C., and said degree of oxidation is of from 50 to 70%.

18. The polyarylene sulfoxide as claimed in claim 8, wherein said polar organic solvent is dimethyl sulfoxide, N-alkylated acid amide, N-alkylated cyclic lactam or a mixture thereof.

19. The method as claimed in claim 3, wherein said shaped articles are in the form of films, membranes, nonwovens and fibers.

* * * * *